US010999292B2

(12) United States Patent
Arana et al.

(10) Patent No.: US 10,999,292 B2
(45) Date of Patent: May 4, 2021

(54) LOCATION-BASED RESTRICTION OF CONTENT TRANSMISSION

(71) Applicant: Disney Enterprises, Inc., Burbank, CA (US)

(72) Inventors: Mark Arana, Agoura Hills, CA (US); Steven M. Chapman, Newbury Park, CA (US)

(73) Assignee: Disney Enterprises, Inc., Burbank, CA (US)

(*) Notice: Subject to any disclaimer, the term of this patent is extended or adjusted under 35 U.S.C. 154(b) by 174 days.

(21) Appl. No.: 16/112,521

(22) Filed: Aug. 24, 2018

(65) Prior Publication Data

US 2020/0067939 A1    Feb. 27, 2020

(51) Int. Cl.
*H04L 29/06* (2006.01)
*H04W 4/021* (2018.01)

(52) U.S. Cl.
CPC .......... *H04L 63/107* (2013.01); *H04W 4/021* (2013.01)

(58) Field of Classification Search
CPC ........ H04L 63/107; H04W 4/021; H04W 4/06
See application file for complete search history.

(56) References Cited

U.S. PATENT DOCUMENTS

| | | | |
|---|---|---|---|
| 8,213,898 B2 | 7/2012 | Choti | |
| 8,423,004 B2 | 4/2013 | Goodmon | |
| 8,848,656 B2 | 9/2014 | Horn | |
| 8,976,221 B2 | 3/2015 | Granstrom | |
| 9,208,506 B2 | 12/2015 | Geer | |
| 9,589,255 B1 | 3/2017 | Sandrew | |
| 9,609,117 B2 | 3/2017 | Davis | |
| 10,045,092 B2 | 8/2018 | Deuel | |
| 2007/0027809 A1 | 2/2007 | Alve | |
| 2007/0129083 A1* | 6/2007 | Creamer | H04W 4/029 455/456.1 |
| 2007/0266396 A1 | 11/2007 | Estermann | |
| 2008/0133791 A1* | 6/2008 | Hodges | H04W 8/22 710/33 |
| 2009/0217344 A1* | 8/2009 | Bellwood | H04L 63/107 726/1 |
| 2010/0122305 A1* | 5/2010 | Moloney | H04N 21/2225 725/93 |
| 2016/0043817 A1 | 2/2016 | Handoush | |

(Continued)

OTHER PUBLICATIONS

Restrictions on Live Streaming—YouTube Help. *Google*, Google, support.google.com/youtube/answer/2853834?hl=en.pp. 1-2.

*Primary Examiner* — Nelson S. Giddins
(74) *Attorney, Agent, or Firm* — Farjami & Farjami LLP (57) ABSTRACT

The present application discloses computing platforms and methods for performing location-based restriction of content transmission. In one implementation, such a computing platform includes a hardware processor and a memory storing a content protection software code. The hardware processor is configured to execute the content protection software code to obtain a media content including a cue for restricting broadcast of the media content, and to detect the cue in the media content. The hardware processor is further configured to execute the content protection software code to interpret the cue to identify a usage rule constraining the broadcast of the media content, and to restrict the broadcast of the media content based on the usage rule.

20 Claims, 4 Drawing Sheets

(56) References Cited

U.S. PATENT DOCUMENTS

2016/0309204 A1   10/2016  Stefandis
2017/0222962 A1    8/2017  Gauglitz
2018/0088669 A1*  3/2018  Ramaprakash .... A61B 5/04842
2018/0139472 A1    5/2018  Shaw
2019/0261064 A1*  8/2019  Ojala ................ H04N 21/8358

* cited by examiner

LOCATION-BASED RESTRICTION OF CONTENT TRANSMISSION

BACKGROUND

In-person attendance at a live performance, movie premier, or invitation only event, for example, can be an exciting and enjoyable experience for attendees. That experience may be rendered even more special because attendees know that they are part of an exclusive audience privileged to share the experience in the moment. However, the ubiquity of personal communication devices and the ease with which audio and video can be recorded and transmitted using those devices has enabled real-time streaming of live performances and other content intended to be available exclusively to a limited audience. Unfortunately, such unrestrained distribution of content intended for a limited audience can diminish the value of that content to its intended audience, the artists presenting the content, and the owners of the content.

SUMMARY

There are provided computing platforms and methods for performing location-based restriction of content transmission, substantially as shown in and/or described in connection with at least one of the figures, and as set forth more completely in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Figure 1:
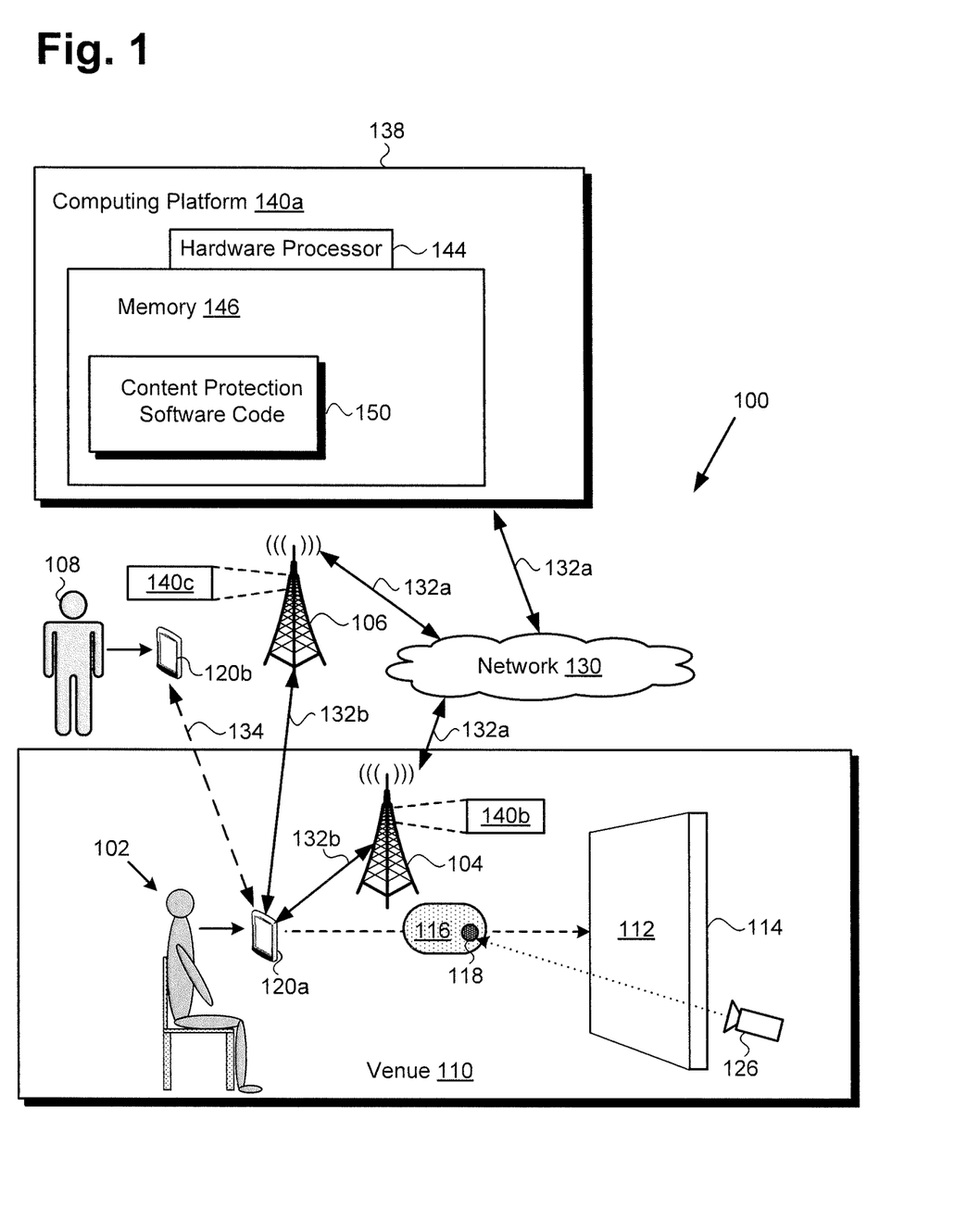
FIG. 1 shows a diagram of a content distribution environment including exemplary computing platforms for performing location-based restriction of content transmission, according to one implementation.

FIG. 1 shows a diagram of exemplary content distribution environment 100 including venue 110, content distribution server 138 including computing platform 140a, personal communication device 120a used by venue guest 102, and personal communication device 120b utilized by user 108 outside of venue 110. As shown in FIG. 1, venue 110 includes display screen 114 presenting performance 112, media content 116 capturing performance 112 and including cue 118, and exemplary source 126 of cue 118. As used herein, the expression "performance" may refer to a presentation of a prerecorded performance or event, such as a cinematic film, as well as to a live event, such as a stage play, concert, red carpet event, or sporting event, for example Content distribution environment 100 further includes communication network 130, in-venue broadcast tower 104 including computing platform 140b, and out-of-venue broadcast tower 106 including computing platform 140c. Also shown in FIG. 1 are network communication links 132a, wireless broadcast communication links 132b, and peer-to-peer wireless communication link 134. Thus, it is noted that computing platform 140b is part of in-venue broadcast tower 104 communicatively coupled to communication network 130, while computing platform 140c is part of out-of-venue broadcast tower 106 communicatively coupled to communication network 130.

According to the exemplary implementation shown in FIG. 1, computing platform 140a of content distribution server 138 includes hardware processor 144, and memory 146 implemented as a non-transitory storage device storing content protection software code 150. It is noted that, although the present application refers to content protection software code 150 as being stored in memory 146 for conceptual clarity, more generally, memory 146 may take the form of any computer-readable non-transitory storage medium.

The expression "computer-readable non-transitory storage medium," as used in the present application, refers to any medium, excluding a carrier wave or other transitory signal that provides instructions to hardware processor 144 of computing platform 140a, or to a hardware processor of computing platforms 140b, 140c, or personal communication device 120a (additional hardware processors not shown in FIG. 1). Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is also noted that although depicted as including single computing platform 140a, in FIG. 1, more generally, content distribution server 138 may include one or more computing platforms 140a, such as computer servers, which may form an interactively linked but distributed system. That is to say, content distribution server 138 may be implemented as network based content distribution server 138 in the form of one or more computing platforms 140a. In one such implementation, computing platform 140a may correspond to one or more web servers, accessible over a packet-switched to network such as the Internet, for example. Alternatively, computing platform 140a may correspond to one or more computer servers supporting a wide area network (WAN), local area network (LAN), or included in another type of limited distribution or private network.

Analogously, although in-venue broadcast tower 104 and out-of-venue broadcast s tower 106 are depicted respectively as single broadcast towers, that representation is also provided merely in the interests of conceptual clarity. That is to say, in-venue broadcast tower 104 may correspond to multiple in-venue broadcast towers (hereinafter "in-venue broadcast tower(s) 104"). Similarly, out-of-venue broadcast tower 106 may correspond to multiple out-of-venue broadcast towers (hereinafter "out-of-venue broadcast tower(s) 106"). It is noted that out-of-venue broadcast tower(s) 106 and/or in-venue broadcast tower(s) 104 may enable triangulation of the geolocation of personal communication device 120a within venue 110 based on signal strengths.

According to the exemplary implementation shown in FIG. 1, venue guest 102 may enjoy performance 112, as well as utilize personal communication device 120a to capture performance 112 in media content 116 during performance 112. However, venue guest 102 may not live stream or otherwise broadcast media content 116 to user 108 outside of venue 110, either using communication network 130 or peer-to-peer wireless communication link 134. For example, venue guest 102 may be prevented from sharing a live stream of performance 112 with user 108 and/or other users outside of venue 110 via social media. As a specific example, a user at a live event may record the live event as media content 116, try to rebroadcast the media content on Twitch®, Twitch® will check for a Do Not Broadcast signal and prevent the rebroadcast. The "do not broadcast" signal may have an expiration time, such as one (1) day.

That location-based restriction on the transmission of media content 116 may be enforced by content protection software code 150, executed by hardware processor 144, and based on one or more usage rules included in or associated with cue 118, as described in greater detail below. That is to say, content protection software code 150 may be executed by hardware processor 144 of computing platform 140a to enforce a geo-fencing protocol preventing or otherwise restricting broadcast of media content 116 from venue 110 to user 108 outside of venue 110.

It is noted that although personal communication device 120a is shown as a smartphone or tablet computer in FIG. 1, that representation is provided merely as an example. More generally, personal communication device 120a may be any suitable portable computing device or system capable of performing data processing sufficient to provide a user interface, support connections to communication network 130 and/or peer-to-peer wireless communication link 134, and implement the functionality ascribed to personal communication device 120a herein. It is also noted that although personal communication device 120b is shown as a mobile device in the form of a smartphone or tablet computer in FIG. 1, that representation is also provided merely as an example. More generally, personal communication device 120b may be any suitable mobile or stationary computing device or system. For example, in other implementations, personal communication device 120b may take the form of a digital media player, gaming console, laptop computer, desktop computer, or smart TV for example.

In some implementations, venue 110 may take the form of an indoor venue. Such indoor venues may include a cinema, a theater, a concert hall, or an enclosed sports arena, to name a few examples. Alternatively, in some implementations, venue 110 may take the form of an outdoor venue. Outdoor venues corresponding to venue 110 may include an open air sports arena or stadium, a venue for a red carpet event, a resort property, and a theme park, again to name merely a few examples. In the exemplary implementation shown in FIG. 1, performance 112 presented via display screen 114 of venue 110 may be any previously performed and pre-recorded artistic, sports, or entertainment event. Thus, performance 112 may be a cinematic film, or a pre-recorded sports match, concert, opera, or dramatic or musical stage production, for example.

Figure 2:
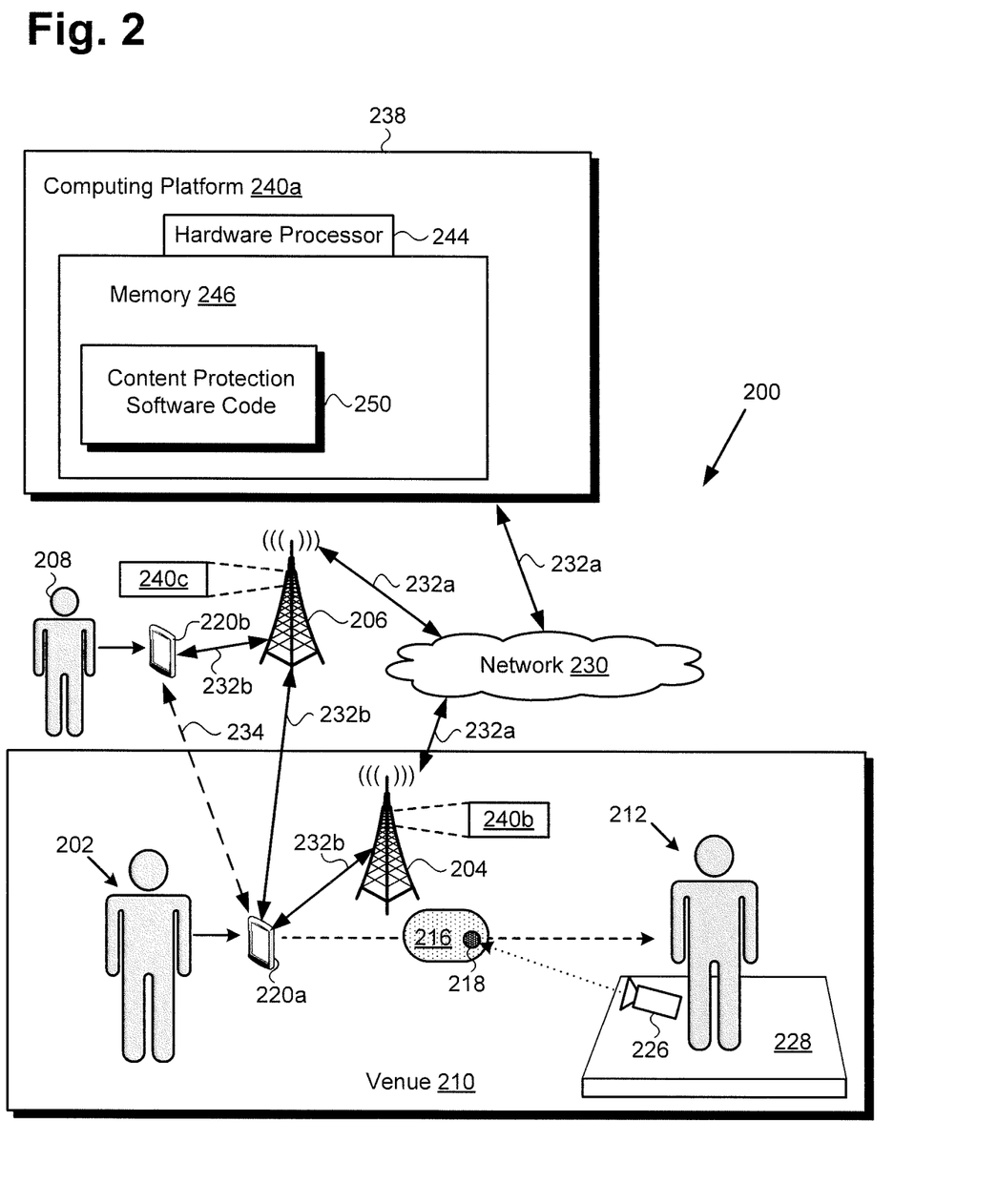
FIG. 2 shows a diagram of a content distribution environment including exemplary computing platforms for performing location-based restriction of content transmission, according to another implementation.

FIG. 2 shows a diagram of exemplary content distribution environment 200 including venue 210, content distribution server 238 including computing platform 240a, personal communication device 220a used by venue guest 202, and personal communication device 220b utilized by user 208 outside of venue 210. As shown in FIG. 2, venue 210 includes live event stage 228 presenting live performance 212, media content 216 capturing live performance 212 and including cue 218, and exemplary source 226 of cue 218. As further shown in FIG. 2, computing platform 240a of content distribution server 238 includes hardware processor 244, and memory 246 implemented as a non-transitory storage device storing content protection software code 250.

Content distribution environment 200 further includes communication network 230, in-venue broadcast tower 204 including computing platform 240b, and out-of-venue broadcast tower 206 including computing platform 240c. Also shown in FIG. 2 are network communication links 232a, wireless broadcast communication links 232b, and peer-to-peer wireless communication link 234.

Venue 210, content distribution server 238, personal communication devices 220a and 220b, and peer-to-peer wireless communication link 234 correspond respectively in general to venue 110, content distribution server 138, personal communication devices 120a and 120b, and peer-to-peer wireless communication link 134 in FIG. 1. In other words, venue 210, content distribution server 238, personal communication devices 220a and 220b, and peer-to-peer wireless communication link 234 may share any of the characteristics attributed to respective venue 110, content distribution server 138, personal communication devices 120a and 120b, and peer-to-peer wireless communication link 234 by the present disclosure, and vice versa.

In addition, communication network 230, network communication links 232a, in-venue broadcast tower 204, out-of-venue broadcast tower 206, and wireless broadcast communication links 232b correspond respectively in general to communication network 130, network communication links 132a, in-venue broadcast tower(s) 104, out-of-venue broadcast tower(s) 106, and wireless broadcast communication links 132b, in FIG. 1. That is to say, communication network 230, network communication links 232a, in-venue and out-of-venue broadcast towers 204 and 206, and wireless broadcast communication links 232b may share any of the characteristics attributed to respective communication network 130, network communication links 132a, in-venue and out-of-venue broadcast towers 104 and 106, and wireless broadcast communication links 132b by the present disclosure, and vice versa.

Consequently, computing platform 240b is part of in-venue broadcast tower 204 communicatively coupled to communication network 230, while computing platform 240c is part of out-of-venue broadcast tower 206 communicatively coupled to communication network 230. Moreover, like in-venue broadcast tower(s) 104, in-venue broadcast tower 204 may correspond to one or more in-venue broadcast tower(s) (hereinafter "in-venue broadcast tower(s) 204"). Analogously, like out-of-venue broadcast tower(s) 106, out-of-venue broadcast tower 204 may correspond to one or more out-of-venue broadcast tower(s) (hereinafter "out-of-venue broadcast tower(s) 206").

Moreover, media content 216, cue 218, and source 226 of cue 218 correspond respectively in general to media content 116, cue 118, and source 126 of cue 118, in FIG. 1, and those corresponding features may share the characteristics attributed to either corresponding feature by the present disclosure. It is noted that although media content 116/216 is shown and described as capturing performance 112/212 in FIGS. 1 and 2, that representation is merely exemplary. In other implementations, media content 116/216 may be a location or venue exclusive content, such as a photo, video, or audio file for example, available to guest 102/202 of venue 110/210, but prohibited from being shared with user 108/208 outside of venue 110/210.

It is further noted that in implementations in which media content 116/216 captures performance 112/212, cue 118/218 including or associated with one or more usage rules for constraining the broadcast of media content 116/216 may take a variety of forms. For example, in one implementation, source 126/226 of cue 118/218 may be a static image, such as a logo or marker, for instance, displayed concurrently with the presentation of performance 112/212 and captured by media content 116/216 as cue 118/218.

Alternatively, or in addition, cue 118/218 may be an audio signal or video signal, for example, in which respective use cases, source 126/226 of cue 118/218 may be implemented as a speaker or video source emitting cue 118/218 concurrently with the presentation of performance 112/212. In another implementation, cue 118/218 may be an encoded light signal and source 126/226 of cue 118/218 may be a light source generating that light signal concurrently with the presentation of performance 112/212. In yet another implementation, cue 118/218 may correspond to a radio-frequency (RF) signal, or a geolocation unique identification (UID) or signal, for example, in which respective use cases, source 126/226 of cue 118/218 may be implemented as an RF or geolocation transmitter broadcasting cue 118/218 concurrently with the presentation of performance 112/212. It is noted that a geolocation UID can be restricted based on tagging, broadcast rights, or government security.

According to the exemplary implementation shown in FIG. 2, and in contrast to the implementation shown in FIG. 1, performance 212 may be a live performance, such as an artistic, sports, or entertainment event. Thus, live performance 212 may be a stage play, a Broadway style musical, a live concert, opera, or symphony performance, a red carpet event, or a live sporting event, to name a few examples.

Figure 3:
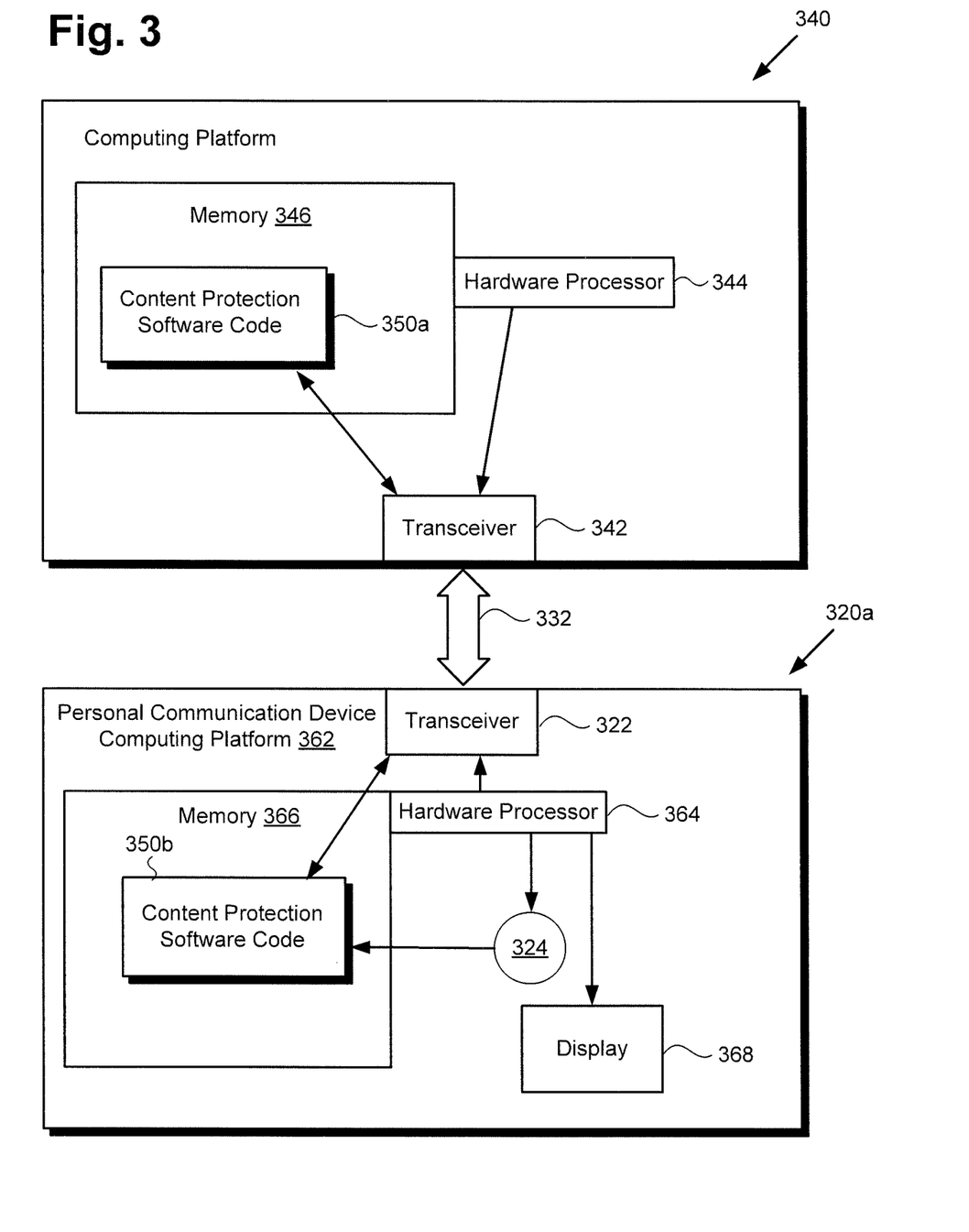
FIG. 3 shows a diagram including a more detailed exemplary representation of computing platforms for performing location-based restriction of content transmission, according to one implementation.

FIG. 3 shows a diagram including a more detailed exemplary representation of computing platforms for performing location-based restriction of content transmission, according to one implementation. As shown in FIG. 3, one such computing platform is personal communication device computing platform 362 (hereinafter "computing platform 362) included as part of personal communication device 320a. As further shown in FIG. 3, another such computing platform is computing platform 340.

Personal communication device 320a is shown to be communicatively coupled to computing platform 340 over communication link 332. Computing platform 340 includes transceiver 342, hardware processor 344, and memory 346 storing content protection software code 350a. Computing platform 340 corresponds in general to any or all of computing platforms 140a/140b/140c/240a/240b/240c, in FIGS. 1 and 2. As a result, computing platforms 140a/140b/140c/240a/240b/240c may share any of the characteristics attributed to computing platform 340 by the present disclosure, and vice versa. Thus, although not shown in FIGS. 1 and 2, computing platform 140a/240a may include a transceiver corresponding to transceiver 342, while computing platforms 140b/140c/240b/24c may include features corresponding to each of transceiver 342, hardware processor 344, and memory 346 storing content protection software code 350a.

Computing platform 362 of personal communication device 320a includes hardware processor 364 and memory 366 implemented as a non-transitory storage device storing content protection software code 350b. As also shown in FIG. 3, computing platform 362 may include any or all of transceiver 322, camera 324, and display 368.

Personal communication device 320a corresponds in general to personal communication device 120a/220a, in FIGS. 1 and 2, and those corresponding features may share any of the characteristics attributed to either corresponding feature by the present disclosure. Thus, like personal communication device 320a, personal communication device 120a/220a may include features corresponding to computing platform 362 including hardware processor 364, transceiver 322, camera 324, display 368, and memory 366 storing content protection software code 350b.

Transceivers 322 and 342 may be implemented as wireless communication units enabling personal communication device 120a/220a/320a to exchange data with computing platform 340 via communication link 332. It is noted that communication link 332 corresponds in general to any or all of network communication links 132a/232a and wireless broadcast communication links 132b/232b, in FIGS. 1 and 2.

Camera 324 may include a red-green-blue (RGB) still image camera and/or video camera capable of capturing audio as well as visual content. Moreover, in some implementations, camera 324 may correspond to an array of RGB still image and/or video cameras configured to generate a panoramic image of a performance venue, such as venue 110. That is to say, camera 324 may be configured to produce media content 116/216 as an audiovisual recording of performance 112/212. Display 368 of personal communication device 120a/220a/320a may be implemented as a liquid crystal display (LCD), a light-emitting diode (LED) display, an organic light-emitting diode (OLED) display, or another suitable display screen that performs a physical transformation of signals to light.

Content protection software code 350a and 350b, in FIG. 3, correspond in general to content protection software code 150/250, in FIGS. 1 and 2. In other words, content protection software code 350a and 350b may share any of the features and functionality attributed to corresponding content protection software code 150/250 by the present disclosure, and vice versa.

As shown in FIG. 3, content protection software code 350b may be located in memory 366, after being received via communication link 132a/132b/232a/232b/332, either from computing platform 140a/140b/140c/240a/240b/240c/340 or from an authorized third party source of content protection software code 350b. In one implementation, communication link 132a/132b/232a/232b/332 corresponds to transfer of content protection software code 350b over a packet-switched network, for example. Once transferred, for instance by being downloaded over communication link 132a/132b/232a/232b/332, content protection software code 350b may be persistently stored in memory 366 of computing platform 362, and content protection software code 350b may be executed locally on personal communication device 120a/220a/320a by hardware processor 364.

Figure 4:
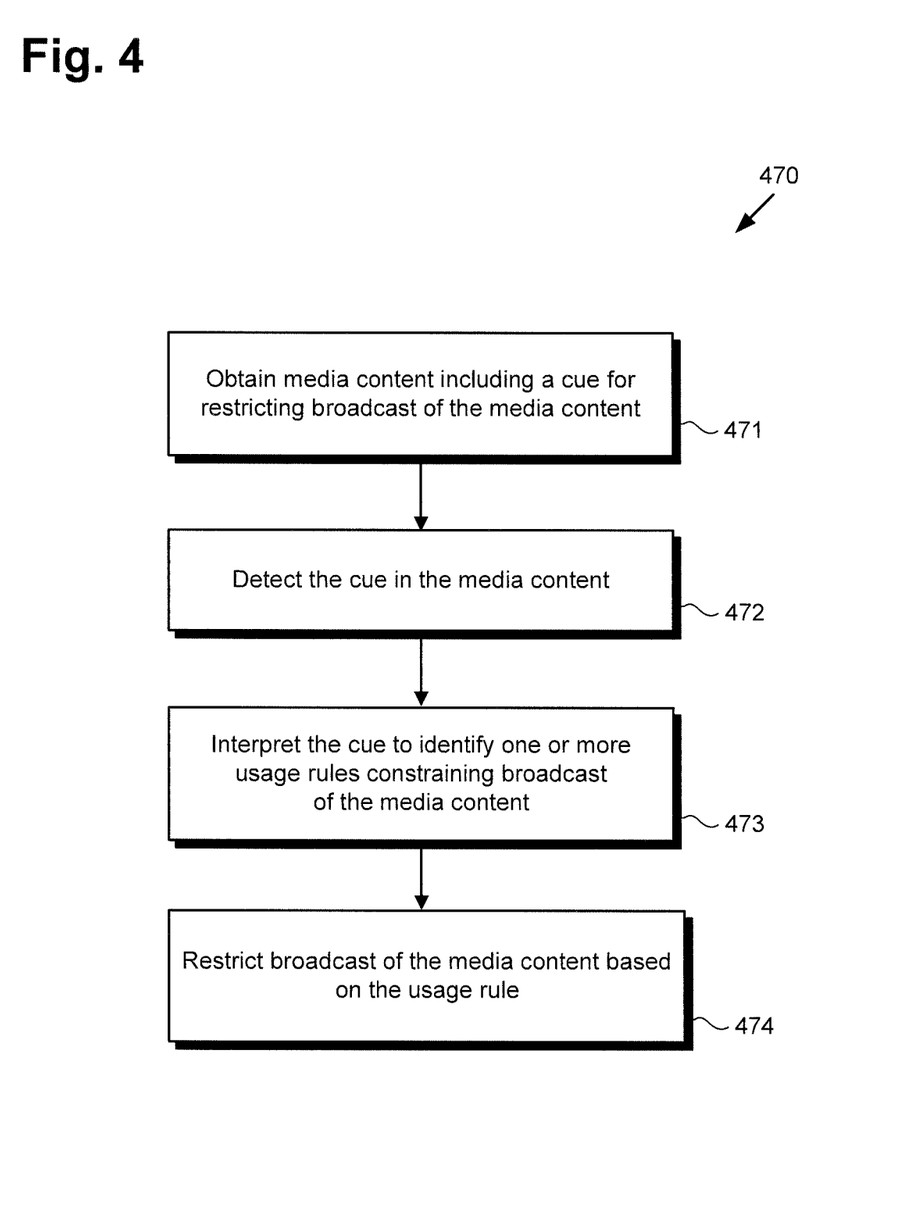
FIG. 4 is a flowchart presenting an exemplary method for use by a computing platform to perform location-based restriction of content transmission.

The functionality of content protection software code 150/250/350a/350b will be further described by reference to FIG. 4 in combination with FIGS. 1, 2, and 3. FIG. 4 shows flowchart 470 presenting an exemplary method for use by a computing platform to perform location-based restriction of content transmission. With respect to the method outlined in FIG. 4, it is noted that certain details and features have been left out of flowchart 470 in order not to obscure the discussion of the inventive features in the present application.

Referring to FIG. 4 in combination with FIGS. 1, 2, and 3, flowchart 470 begins with obtaining media content 116/216 including cue 118/218 for restricting to broadcast of media content 116/216 (action 471). As noted above, personal communication device 120a/220a/320a may include camera 324 capable of capturing or recording audio as well as visual content. Thus, as noted above, media content 116/216 may capture performance 112/212 and may be produced by camera 324 of personal communication device 120a/220a/320a, used by venue guest 102/202.

As noted above, in one implementation, source 126/226 of cue 118/218 may be a static image, such as a logo or marker, for instance, displayed concurrently with the presentation of performance 112/212 and captured by media content 116/216 as cue 118/218. Alternatively, or in addition, cue 118/218 may be an audio signal, a video signal, may correspond to an RF signal, or may correspond to a signal identifying a geolocation of venue 110/210, such as a Global Positioning System (GPS) signal, for example. In some implementations, for instance, cue 118/218 may be embedded in media content 116/216 in response to reception of a geolocation signal provided by in-venue broadcast tower(s) 104/204, which may be a private broadcast tower or towers of venue 110/210 supporting cellular communications.

It is noted that in implementations in which cue 118/218 is an audio signal, video signal, or encoded light signal, cue 118/218 may be imperceptible to someone enjoying performance 112/212, such as venue guest 102/202, but nevertheless be captured by camera 324 and included in media content 116/216. That is to say, the imperceptible audio or video may be combined with a recorded content such as media content 116/216. It is further noted that in implementations in which cue 118/218 corresponds to an RF signal or to a signal identifying the geolocation of venue 110/210, that signal or signals corresponding to cue 118/218 may be received by transceiver 322 of personal communication device 120a/220a/320a.

In some implementations, media content 116/216 may be produced using personal communication device 120a/220a/320a, and may be subsequently transmitted to computing platform 140a/140b/140c/240a/240b/240c/340 via communication network 130 and communication link(s) 132a/132b/232a/232b/332. In those implementations media content 116/216 of performance 112/212 may be obtained by being received from personal communication device 120a/220a/320a by content protection software code 150/250/350a, executed by hardware processor 144/244/344.

Alternatively and as also noted above, in some implementations, content protection software code 350b may be stored locally on memory 366 of personal communication device 120a/220a/320a. In those implementations, media content 116/216 of performance 112/212 may be obtained using camera 324 of personal communication device 120a/220a/320a, for example, by content protection software code 350b, executed by hardware processor 364.

Flowchart 470 continues with detecting cue 118/218 in media content 116/216 (action 472). Detection of cue 118/218 in media content 116/216 may be performed by content protection software code 150/250/350a, executed by hardware processor 144/244/344 of computing platform 140a/140b/140c/240a/240b/240c/340. Alternatively, in some implementations, detection of cue 118/218 in media content 116/216 may be performed by content protection software code 350b, executed by hardware processor 364 of personal communication device 120a/220a/320a.

Depending on the specific implementation, content protection software code 150/250/350a/350b may be configured to detect cue 118/218 in media content 116/216 in a number of different ways. For example, in implementations in which cue 118/218 is a static image or video signal included in media content 116/216, content protection software code 150/250/350a/350b may be configured to perform image analysis on media content 116/216 to detect cue 118/218. Analogously, in implementations in which cue 118/218 is an audio signal included in media content 116/216, content protection software code 150/250/350a/350b may be configured to perform audio analysis on media content 116/216 to detect cue 118/218.

It is noted that in implementations in which cue 118/218 corresponds to an RF signal or geolocation signal, cue 118/218 may take the form of metadata included in media content 116/216. In those implementations, content protection software code 150/250/350a/350b may be configured to parse media content 116/216 to detect metadata cue 118/218. Thus, cues 118/218 may be predefined signals, or data coded into signals, and may be determined based on business rules.

Flowchart 470 continues with interpreting cue 118/218 to identify one or more usage rules (hereinafter "usage rule(s)") constraining the broadcast of media content 116/216 (action 473). It is noted that, in some implementations, cue 118/218 may include usage rule(s) constraining the broadcast of media content 116/216, while in other implementations cue 118/218 may enable identification of such usage rule(s). For example, where cue 118/218 is received as an audio signal, video signal, encoded light signal, or RF signal, cue 118/218 may carry or include usage rule(s) constraining the broadcast of media content 116/216. By contrast, where cue 118/218 is received as a static image or as a geolocation signal, for example, the usage rule(s) constraining the broadcast of media content 116/216 may be identified based on cue 118/218.

In some implementations, interpretation of cue 118/218 and the identification of usage rule(s) constraining the broadcast of media content 116/216 may be performed by content protection software code 150/250/350a, executed by hardware processor 144/244/344 of computing platform 140a/140b/140c/240a/240b/240c/340. Alternatively, in some implementations, interpretation of cue 118/218 and identification of the usage rule(s) constraining the broadcast of media content 116/216 may be performed by content protection software code 350b, executed by hardware processor 364 of personal communication device 120a/220a/320a.

The usage rule(s) included in or associated with cue 118/218 may vary according to the type or level of protection desired for media content 116/216. Two types of signals corresponding to cue 118/218 could be transmitted: one absolutely prohibiting rebroadcast, another prohibiting rebroadcast under certain conditions. For example, cue 118/218 may include or be associated with a usage rule prohibiting or preventing broadcast of media content 116/216 from within venue 110/210, or from within a predetermined vicinity of venue 110/210, to a device, system, or user outside of venue 110/210. Alternatively, or in addition, cue 118/218 may include or be associated with a usage rule prohibiting or preventing broadcast of media content 116/216 for a predetermined time interval, such as a predetermined time interval following termination of the presentation of performance 112/212 at venue 110/210. In other words, cue 118/218 may include or be associated with a usage rule requiring that broadcast of media content 116/216 be delayed for a predetermined time interval, such as an interval of twenty-four or forty-eight hours, for example.

According to some implementations, the usage rule(s) constraining the broadcast of media content 116/216 may take the form of a location specific "do not broadcast" rule or rules. In those implementations, content protection software code 150/250/350a/350b may identify a location of personal communication device 120a/220a/320a based on a GPS or other geolocation signal. Content protection software code 150/250/350a/350b may then compare that location to an online database of broadcast prohibited locations. In those implementations, the usage rule(s) constraining the broadcast of media content 116/216 may be analogous to restrictions imposed on aerial drones by "do not fly" zones established by the Federal Aviation Administration (FAA), for example.

Alternatively, or in addition, in some implementations, cue 118/218 may include or be associated with a usage rule restricting broadcast of media content 116/216 to a predetermined and limited number of other users or devices. Alternatively, or in addition, in some implementations, cue 118/218 may include or be associated with a usage rule restricting broadcast of media content 116/216 to a specific display resolution, such as standard-definition (SD) video, high-definition (HD) video, 2K video, or 4K video, for example. Alternatively, or in addition, in some implementations, cue 118/218 may include or be associated with a usage rule restricting broadcast of media content 116/216 to specific geographic regions, while prohibiting or preventing broadcast of media content 116/216 outside of those regions. Additional or alternative usage rules may restrict broadcast of media content 116/216 to certain frequencies, or prohibit its broadcast by certain entities, or in certain countries.

Flowchart 470 can conclude with restricting the broadcast of media content 116/216 based on the usage rule(s) included in or associated with cue 118/218 (action 474). In some implementations, restricting the broadcast of media content 116/216 based on the usage rule(s) included in or associated with cue 118/218 may be performed by content protection software code 150/250/350a, executed by hardware processor 144/244/344 of computing platform 140a/140b/140c/240a/240b/240c/340. Alternatively, in some implementations, restricting the broadcast of media content 116/216 based on the usage rule(s) included in or associated with cue 118/218 may be performed by content protection software code 350b, executed by hardware processor 364 of personal communication device 120a/220a/320a.

As noted above, restricting the broadcast of media content 116/216 may include any or all of prohibiting or preventing its broadcast from within a predetermined vicinity of venue 110/210, delaying its broadcast for a predetermined time interval, limiting its broadcast to a predetermined number of users, or to specific geographical regions, or to some display resolutions but not others, to name a few examples. As a result, the present solution enables protection of media content 116/216 without unreasonably limiting the ability of venue guest 102/202 to enjoy that content.

For example, according to the present inventive principles, venue guest is not prevented from capturing performance 112/212 and retaining a recording of performance 112/212 as media content 116/216. In one aspect, the present solution allows recorded content such as media content 116/216 to be played locally, but not be rebroadcast. As a result, the present solution can advantageously prevent live streaming of performance 112/212 while permitting post-performance enjoyment or sharing of media content 116/216 capturing performance 112/212 by venue guest 102/202.

Thus, the present application discloses systems and methods for performing location-based restriction of content transmission. By detecting a location-based cue for restricting broadcast of media content by a venue guest, the present solution enables the identification of protected content. In addition, by interpreting the cue to identify one or more usage rules constraining the broadcast of the media content, the content protection solution disclosed in the present application advantageously enables the application of a range of broadcast restrictions corresponding to the level of content protection desired.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A computing platform comprising:
a hardware processor, a camera and a memory storing a content protection software code;
wherein the hardware processor is configured to execute the content protection software code to:
capture, using the camera, a video of a performance in a venue;
detect, while capturing the video of the performance, a cue generated in the venue by a cue source other than the performance for restricting a broadcast of the video of the performance;
interpret the cue to identify a usage rule restricting the broadcast of the video of the performance; and
restrict the broadcast of the video of the performance based on the usage rule.

2. The computing platform of claim 1, wherein the computing platform is part of a broadcast tower communicatively coupled to a communication network.

3. The computing platform of claim 1, wherein the computing platform is a network based content distribution server.

4. The computing platform of claim 1, wherein the computing platform is a personal communication device.

5. The computing platform of claim 1, wherein the cue identifies a geolocation of the venue.

6. The computing platform of claim 5, wherein the usage rule prohibits the broadcast of the video of the performance from within a vicinity of the geolocation of the venue.

7. The computing platform of claim 1, wherein the cue comprises a light captured in the video.

8. The computing platform of claim 1, wherein the cue comprises a static image captured in the video.

9. The computing platform of claim 1, wherein the cue comprises an audio signal or a radio-frequency (RF) signal.

10. The computing platform of claim 1, wherein the usage rule restricts the broadcast of the video of the performance by the computing platform for a time interval and based on a location of the computing platform.

11. The computing platform of claim 1, wherein the cue comprises a signal imperceptible to a person, and the hardware processor is further configured to execute the content protection software code to detect the cue throughout the performance.

12. A method for use by a computing platform including a hardware processor, a camera and a memory storing a content protection software code, the method comprising:
   capturing, using the camera, a video of a performance in a venue;
   detecting, by the content protection software code executed by the hardware processor, while capturing the video of the performance, a cue generated in the venue by a cue source other than the performance for restricting a broadcast of the video of the performance;
   interpreting, by the content protection software code executed by the hardware processor, the cue to identify a usage rule restricting the broadcast of the video of the performance; and
   restricting, by the content protection software code executed by the hardware processor, the broadcast of the video of the performance based on the usage rule.

13. The method of claim 12, wherein the cue identifies a geolocation of the venue, and wherein restricting the broadcast of the video of the performance based on the usage rule comprises prohibiting the broadcast of the video of the performance from within a vicinity of the geolocation of the venue.

14. The method of claim 12, wherein the cue comprises a light captured in the video.

15. The method of claim 12, wherein the cue comprises one of: a static image captured in the video, an audio signal, or a radio-frequency (RF) signal.

16. The method of claim 12, wherein the computing platform is part of a broadcast tower communicatively coupled to a communication network.

17. The method of claim 12, wherein the computing platform is a network based content distribution server.

18. The method of claim 12, wherein the computing platform is a personal communication device.

19. The method of claim 12, wherein the usage rule restricts the broadcast of the video of the performance by the computing platform for a time interval and based on a location of the computing platform.

20. The method of claim 12, wherein the cue comprises a signal imperceptible to a person, and is detected throughout the performance.

* * * * *